(12) United States Patent
Edara et al.

(10) Patent No.: US 11,880,290 B2
(45) Date of Patent: *Jan. 23, 2024

(54) SCALABLE EXACTLY-ONCE DATA PROCESSING USING TRANSACTIONAL STREAMING WRITES

(71) Applicant: Google LLC, Mountain View, CA (US)

(72) Inventors: Pavan Edara, Mountain View, CA (US); Reuven Lax, Mountain View, CA (US); Yi Yang, Mountain View, CA (US); Gurpreet Singh Nanda, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,257

(22) Filed: Feb. 6, 2023

(65) Prior Publication Data

US 2023/0185688 A1 Jun. 15, 2023

Related U.S. Application Data

(63) Continuation of application No. 17/085,576, filed on Oct. 30, 2020, now Pat. No. 11,573,876.

(51) Int. Cl.
*G06F 11/14* (2006.01)
*G06F 11/30* (2006.01)
(Continued)

(52) U.S. Cl.
CPC ...... *G06F 11/3034* (2013.01); *G06F 9/30047* (2013.01); *G06F 9/467* (2013.01); *G06F 11/0757* (2013.01); *G06F 11/0772* (2013.01); *G06F 11/1402* (2013.01); *G06F 12/0246* (2013.01); *G06F 12/0253* (2013.01); *G06F 2201/84* (2013.01)

(58) Field of Classification Search
CPC .. G06F 11/30; G06F 11/3034; G06F 11/1402; G06F 11/1474; G06F 12/0253; G06F 16/2379; G06F 16/24
See application file for complete search history.

(56) References Cited

U.S. PATENT DOCUMENTS 5,701,480 A 12/1997 Raz
9,639,589 B1 5/2017 Theimer et al.
(Continued)

*Primary Examiner* — Yolanda L Wilson
(74) *Attorney, Agent, or Firm* — Honigman LLP; Brett A. Krueger

(57) ABSTRACT

A method for processing data exactly once using transactional stream writes includes receiving, from a client, a batch of data blocks for storage on memory hardware in communication with the data processing hardware. The batch of data blocks is associated with a corresponding sequence number and represents a number of rows of a table stored on the memory hardware. The method also includes partitioning the batch of data blocks into a plurality of sub-batches of data blocks. For each sub-batch of data blocks, the method further includes assigning the sub-batch of data blocks to a buffered stream; writing, using the assigned buffered stream, the sub-batch of data blocks to the memory hardware; updating a storage log with an intent to commit the sub-batch of data blocks using the assigned buffered stream; and committing the sub-batch of data blocks to the memory hardware.

20 Claims, 10 Drawing Sheets

(51) Int. Cl.
*G06F 9/30* (2018.01)
*G06F 9/46* (2006.01)
*G06F 11/07* (2006.01)
*G06F 12/02* (2006.01)

(56) References Cited

U.S. PATENT DOCUMENTS

| | | | |
|---|---|---|---|
| 2010/0169284 A1* | 7/2010 | Walter | G06F 11/2033 |
| | | | 707/682 |
| 2012/0109895 A1* | 5/2012 | Zwilling | G06F 16/2308 |
| | | | 707/648 |
| 2012/0137164 A1 | 5/2012 | Uhlig et al. | |
| 2016/0147859 A1 | 5/2016 | Lee et al. | |
| 2016/0344834 A1 | 11/2016 | Das | |
| 2017/0083396 A1* | 3/2017 | Bishop | G06F 11/14 |
| 2017/0132271 A1 | 5/2017 | Jiao et al. | |
| 2017/0344440 A1* | 11/2017 | Subrahmanyam | G06F 11/1474 |
| 2018/0165324 A1 | 6/2018 | Krishnaswamy et al. | |
| 2019/0102427 A1 | 4/2019 | Chakkappen et al. | |
| 2019/0317865 A1* | 10/2019 | Heidel | G06F 16/213 |
| 2020/0226035 A1 | 7/2020 | Li | |
| 2020/0364185 A1 | 11/2020 | Beier et al. | |
| 2020/0364240 A1* | 11/2020 | Martin | G06F 16/273 |
| 2021/0089407 A1* | 3/2021 | Gupta | G06F 11/1466 |

* cited by examiner

SCALABLE EXACTLY-ONCE DATA PROCESSING USING TRANSACTIONAL STREAMING WRITES

CROSS REFERENCE TO RELATED APPLICATIONS

This U.S. patent application is a continuation of, and claims priority under 35 U.S.C. § 120 from, U.S. patent application Ser. No. 17/085,576, filed on Oct. 30, 2020. The disclosure of this prior application is considered part of the disclosure of this application and is hereby incorporated by reference in its entirety.

TECHNICAL FIELD

This disclosure relates to scalable exactly-once data processing using transactional streaming writes.

BACKGROUND

As distributed storage (i.e., cloud storage) becomes increasingly popular for storing data records, ensuring that every record is processed exactly once (i.e., records are not lost and are not duplicated) has become increasingly important. Exactly-once processing cannot be done unilaterally in a distributed storage system, as there are multiple different systems producing events and consuming those events. This often results in lost records or duplicated computations. Preventing this requires careful coordination between producing and consuming systems.

SUMMARY

One aspect of the disclosure provides a method of processing data exactly once using transactional streaming writes. The method includes receiving, at data processing hardware, from a client, a batch of data blocks for storage on memory hardware in communication with the data processing hardware. The batch of data blocks is associated with a corresponding sequence number and represents a number of rows of a table stored on the memory hardware. The method also includes partitioning, by the data processing hardware, the batch of data blocks into a plurality of sub-batches of data blocks. For each sub-batch of data blocks, the method further includes assigning, by the data processing hardware, the sub-batch of data blocks to a buffered stream and writing, by the data processing hardware, using the assigned buffered stream, the sub-batch of data blocks to the memory hardware. The method also includes updating, by the data processing hardware, a storage log with an intent to commit the sub-batch of data blocks using the assigned buffered stream and committing, by the data processing hardware, the sub-batch of data blocks to the memory hardware.

Implementations of the disclosure may include one or more of the following optional features. In some implementations the method includes determining, by the data processing hardware, that the writing, using the assigned buffered stream, of the sub-batch of data blocks to the memory hardware has failed to complete before committing the sub-batch of data blocks to the memory hardware, and retrying, by the data processing hardware, using the assigned buffered stream, writing the sub-batch of data blocks to the memory hardware. In these implementations, the method may further include determining, by the data processing hardware, that retrying, using the assigned buffered stream, the writing of the sub-batch of data blocks to the memory hardware has failed to complete before committing the sub-batch of data blocks to the memory hardware and assigning, by the data processing hardware, a new buffered stream to the sub-batch of data blocks. The method may also further include writing, by the data processing hardware, using the assigned new buffered stream, the sub-batch of data blocks to the memory hardware. In response to storing the sub-batch of data blocks using the assigned new buffered stream, the method includes updating, by the data processing hardware, the storage log with a new intent to commit the sub-batch of data blocks using the assigned new buffered stream. In these implementations, the method may also include removing, by the data processing hardware, from the memory hardware, the sub-batch of data blocks assigned to the buffered stream. Optionally, removing the sub-batch of data blocks includes performing garbage-collection on the sub-batch of data blocks assigned to the buffered data stream.

In some examples, the method includes, in response to committing the sub-batch of data blocks to the memory hardware, determining, by the data processing hardware, a current timestamp, and associating, by the data processing hardware, the sub-batch of data blocks with the current timestamp. In these examples, the method may further include converting, by the data processing hardware, the sub-batch of data blocks into a read-optimized format based on the associated timestamp. In some implementations, the method includes receiving, at the data processing hardware, a query request at a snapshot timestamp that requests the return of data blocks stored on the memory hardware that match query parameters. These implementations include returning, by the data processing hardware, any data blocks of the sub-batch of data blocks that match the query parameters when the snapshot timestamp is later than the timestamp associated with the sub-batch of data blocks. In some examples, in response to determining the writing of any of the sub-batches of data blocks to the memory hardware fails to complete, the method includes sending, by the data processing hardware, a batch failure indication to the client, and receiving, by the data processing hardware, from the client, the batch of data blocks associated with the same corresponding sequence number for storage on the memory hardware. The method of committing the sub-batch of data blocks to the memory hardware may include accessing a flush application programming interface (API).

Another aspect of the disclosure provides a system for processing data exactly once using transactional streaming writes. The system includes data processing hardware and memory hardware in communication with the data processing hardware. The memory hardware stores instructions that when executed on the data processing hardware cause the data processing hardware to perform operations. The operations include receiving, from a client, a batch of data blocks for storage. The batch of data blocks is associated with a corresponding sequence number and represents a number of rows of a table stored on the memory hardware. The operations also include partitioning the batch of data blocks into a plurality of sub-batches of data blocks. For each sub-batch of data blocks, the operations further include assigning the sub-batch of data blocks to a buffered stream and writing, using the assigned buffered stream, the sub-batch of data blocks to the memory hardware. The operations also include updating a storage log with an intent to commit the sub-batch of data blocks using the assigned buffered stream and committing the sub-batch of data blocks to the memory hardware.

Implementations of the disclosure may include one or more of the following optional features. In some implementations the operations further include determining that the writing, using the assigned buffered stream, of the sub-batch of data blocks to the memory hardware has failed to complete before committing the sub-batch of data blocks to the memory hardware, and retrying, using the assigned buffered stream, writing the sub-batch of data blocks to the memory hardware. In these implementations, the operations may further include determining that retrying, using the assigned buffered stream, the writing of the sub-batch of data blocks to the memory hardware has failed to complete before committing the sub-batch of data blocks to the memory hardware, assigning a new buffered stream to the sub-batch of data blocks, and writing, using the assigned new buffered stream, the sub-batch of data blocks to the memory hardware. In response to storing the sub-batch of data blocks using the assigned new buffered stream, the operations further include updating the storage log with a new intent to commit the sub-batch of data blocks using the assigned new buffered stream. In these implementations, the operations may further include removing, from the memory hardware, the sub-batch of data blocks assigned to the buffered stream. Optionally, removing the sub-batch of data blocks includes performing garbage-collection on the sub-batch of data blocks assigned to the buffered data stream.

In some examples, the operations further include, in response to committing the sub-batch of data blocks to the memory hardware, determining a current timestamp, and associating the sub-batch of data blocks with the current timestamp. In these examples, the operations may further include converting the sub-batch of data blocks into a read-optimized format based on the associated timestamp. In some implementations, the operations further include receiving a query request at a snapshot timestamp that requests the return of data blocks stored on the memory hardware that match query parameters. These implementations include returning any data blocks of the sub-batch of data blocks that match the query parameters when the snapshot timestamp is later than the timestamp associated with the sub-batch of data blocks. In some examples, in response to determining the writing of any of the sub-batches of data blocks to the memory hardware fails to complete, the operations further include sending a batch failure indication to the client, and receiving, from the client, the batch of data blocks associated with the same corresponding sequence number for storage on the memory hardware. The operations of committing the sub-batch of data blocks to the memory hardware may further include accessing a flush application programming interface (API).

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Distributed storage (i.e., cloud storage) has become increasingly popular for storing data records. As the amount of data increases, larger and more sophisticated systems are needed to process and commit the vast quantities of incoming data. In order to avoid latencies, these systems must commit data every few milliseconds. However, these systems must also ensure that data is processed exactly once. Data processed exactly once is committed to memory exactly once (i.e., is not lost or duplicated). While a potential for exactly-once processing includes creating a stream for every write and commit, creating a stream is a metadata operation that would put severe strain on the metadata system and further limit the scalability of the operation.

In order to limit latencies, data received by distributed storage systems may be written to an unbuffered stream in batches and committed as soon as a positive acknowledgement of the write is returned. In this scenario, exactly-once processing is achieved so long as the dataflow worker (i.e., a process) responsible for writing the batch of data remains alive and completes the write. However, if the dataflow worker crashes or otherwise loses communication with the storage system, there may be lost or duplicated records. For example, a dataflow worker may temporarily fail to complete a write (e.g., due to some transient unavailability). In this example, a retry may create duplicate records if the previous write already wrote a portion of the batch of data.

Implementations herein are directed toward a distributed storage system that processes data exactly once using transactional streaming writes. The system uses buffered streams instead of unbuffered streams to ensure that each received batch of data is processed exactly once. The system commits a write by adding an entry to a storage log. In an unbuffered stream, the system associates each write with a timestamp that the write becomes visible. That is, the timestamp is associated when the system writes the data. For a buffered stream, the system associates each write with a timestamp when the data is committed. That is, the write is not visible until a commit operation (i.e., a "flush" operation) that commits or flushes the data (e.g., a row of data). When reading data, a user sends a query request with a respect to point in time, and the commit timestamp associated with the flush operation helps with faster access and reduces the amount of read ahead for finding the records.

Figure 1:
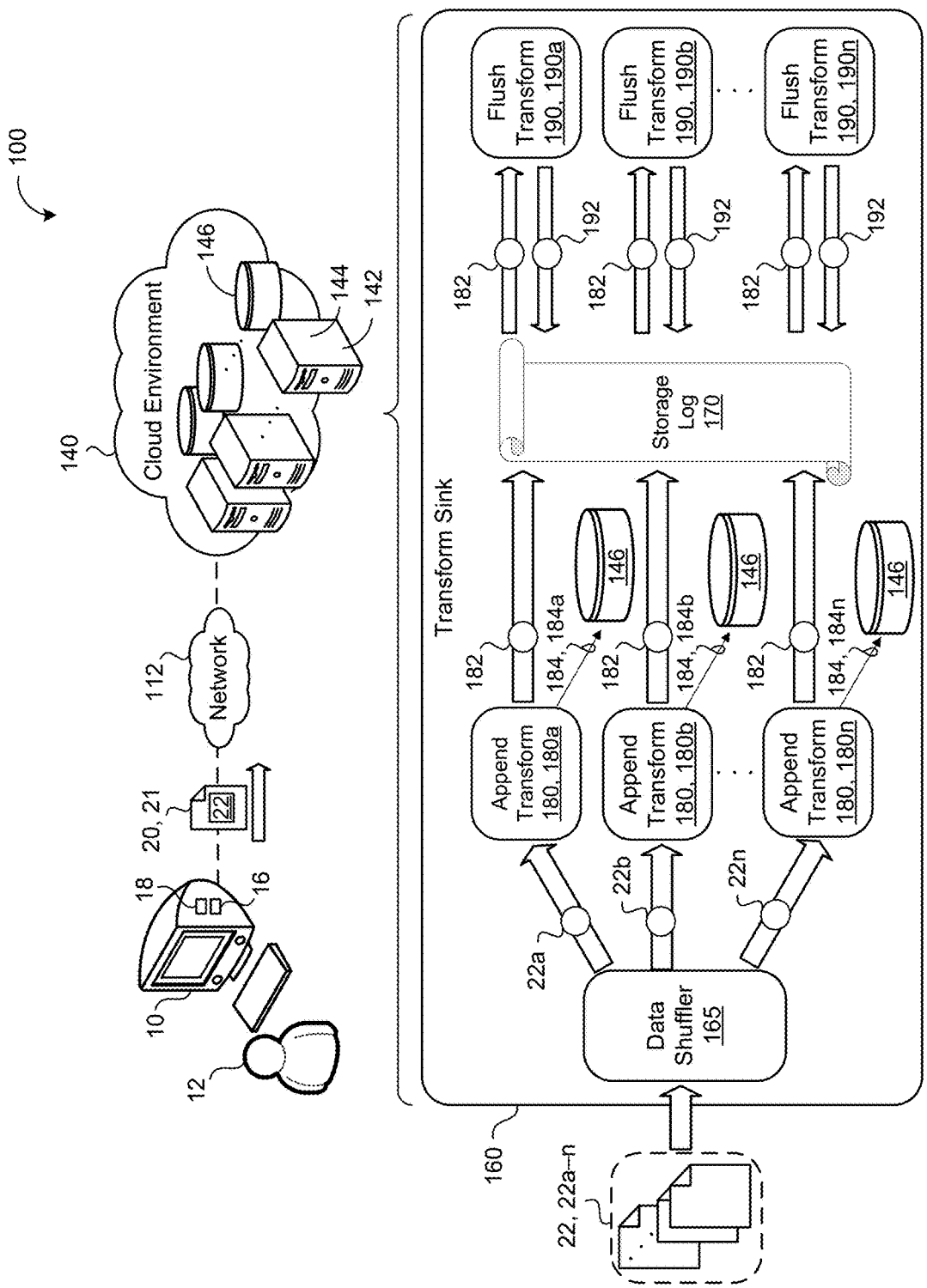
FIG. 1 is a schematic view of an example system for processing data exactly once using transactional streaming writes.

Referring to FIG. 1, in some implementations, an example system 100 includes a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The data store 146 may be configured to store a plurality of data blocks 22 within a data structure (e.g., a table). In some implementations, the data store 146 interfaces with the user device via an application programming interface (API) (e.g., a "flush" API). The remote system 140 executes a transform sink 160 and receives batches of data blocks 22, 22a-n to write to the data store 146. The remote system 140 is configured to receive the batch of data blocks 22 from the user device 10 via the network 112 and write the batch of data blocks 22 to the data store 146.

Each batch of data blocks 22 includes a corresponding row count 20 and a corresponding sequence number 21. Each data block 22 may represent a row of a table stored in the data store 146 and the row count 20 represents a number of rows (i.e., the number of data blocks 22) within the batch. The transform sink 160, in some implementations, includes a data shuffler 165. The data shuffler 165 partitions the received batch of data blocks 22 into a plurality of sub-batches of data blocks 22 (i.e., a plurality of shards). That is, the data shuffler 165 receives the batch of data blocks 22 as an input, and produces the plurality of sub-batches of data blocks 22 as an output. As will be discussed in more detail below, each sub-batch of data blocks 22 is atomic and thus can only be committed after each data block 22 of the sub-batch of data blocks 22 is successfully written to the data store 146.

After partitioning the batch of data blocks 22 into the plurality of sub-batches of data blocks 22, the data shuffler 165 may assign each sub-batch of data blocks 22 to a respective append transform 180, 180a-n. Each append transform 180 uses an assigned buffered stream 184, 184a-n to write the associated sub-batch of data blocks 22 to the data store 146. That is, each append transform 180 includes an assigned buffered stream 184, so that for each received sub-batch of data blocks 22, the append transform 180 opens its assigned buffered stream 184 and writes the sub-batch of data blocks 22 to the data store 146. The data shuffler 165 may send each sub-batch of data blocks 22 to a different append transform 180 so that each sub-batch of data blocks 22 in the batch of data blocks 22 is written to the data store 146 in parallel buffered streams 184 to increase the overall bandwidth of the system 100.

Once the append transform 180 finishes writing the assigned sub-batch of data blocks 22 to the data store 146 using the assigned buffered stream 184, the append transform 180 sends an intent to commit 182 the sub-batch of data blocks 22 to a storage log 170 using the assigned buffered stream 184 or other communication. In response to the intent to commit 182, a respective flush transform 190, 190a-n commits (i.e., "flushes") the sub-batch of data blocks 22 by committing the writes to the storage log 170. Each append transform 180 has a respective independent flush transform 190. Each flush transform 190 ensures that the append transform 180 successfully writes all of the data of the sub-batch of data blocks 22 (via the intent to commit 182) prior to committing the data to guarantee that the data is written exactly once.

In some implementations, updating the storage log 170 with the intent to commit 182 triggers the respective flush transform 190 to commit the sub-batch of data blocks 22 to the data store 146 (e.g., by updating the storage log 170) by directly communicating with the append transform 190. In other implementations, the flush transform 190 periodically checks or polls the storage log 170 for updates from the associated append transform 180. In other words, within the transform sink 160, each append transform 180 has a corresponding flush transform 190, and after the append transform 180 writes a respective sub-batch of data blocks 22 via the buffered stream 184 to the data store 146, the flush transform 190 completes the write by committing the sub-batch of data blocks 22 to the data store 146. Once the flush transform 190 has flushed the sub-batch of data blocks 22, the flush transform 190 updates the storage log 170 with a commit complete indication 192.

Figure 2A:
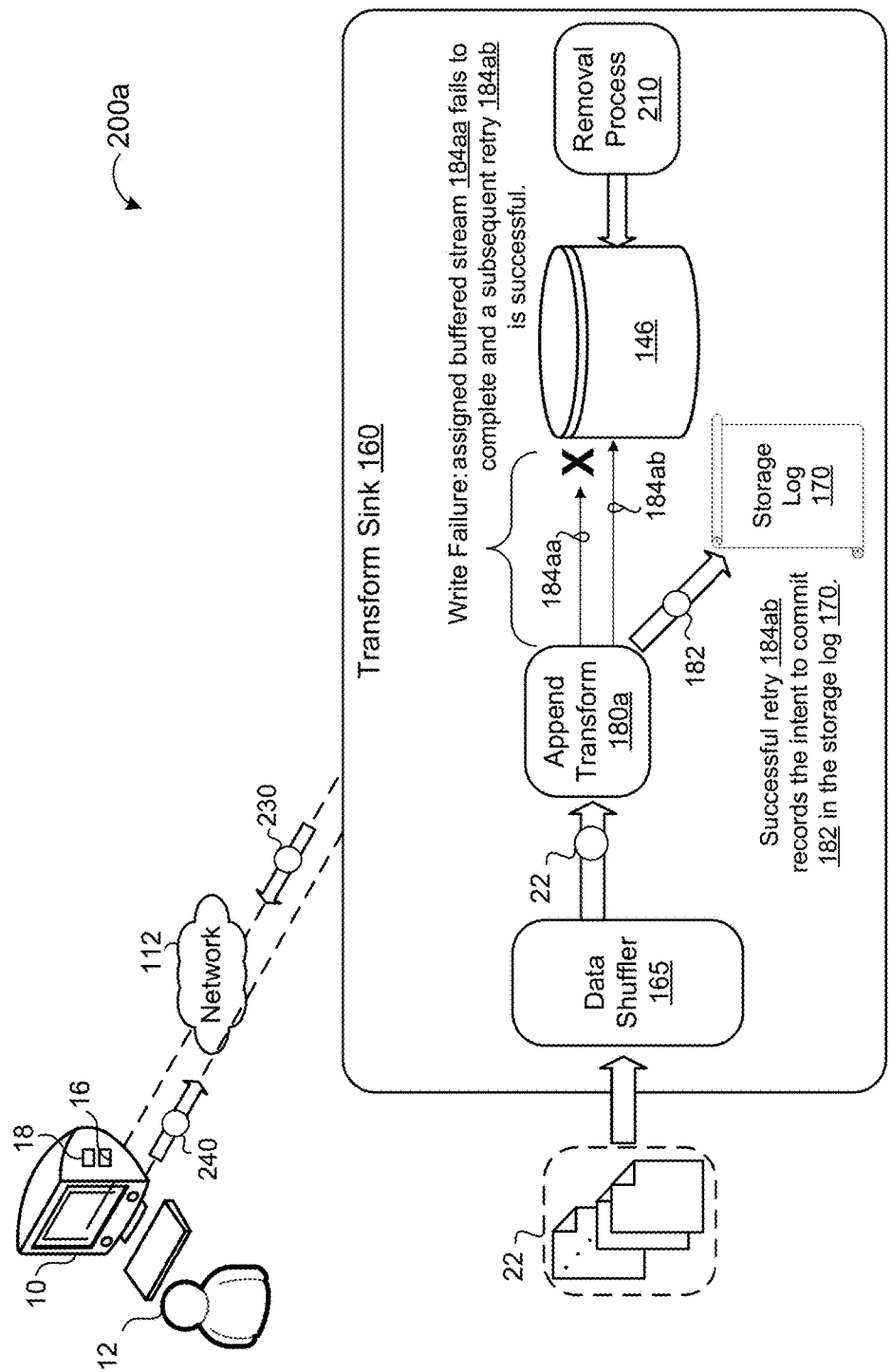
FIGS. 2A and 2B are schematic views of example components of the system of FIG. 1.

Referring now to FIG. 2A, a schematic view 200a illustrates the transform sink 160 ensuring that the sub-batches of data blocks 22 are processed only once. In this example, the transform sink 160 receives a batch of data blocks 22, and the data shuffler 165 partitions the batch of data blocks 22 into a sub-batch of data blocks 22. The data shuffler assigns the sub-batch of data blocks 22 to the append transform 180a. The append transform 180a opens the assigned buffered stream 184aa and begins to write the sub-batch of data blocks 22 to the data store 146 via the buffered stream 184aa.

In some implementations, after a threshold period of time, the transform sink 160 determines that assigned buffered stream 184aa failed to complete writing the sub-batch of data blocks 22 to the data store 146. For example, the transform sink 160 determines that the storage log 170 did not receive an intent to commit 182 from the append transform 180a (which signals that the append transform 180a has successfully completed the write) within the threshold period of time. The assigned buffered stream 184aa may fail due to transient unavailability of the buffered stream 184aa or because the append transform 180a is a failed worker (e.g., a "zombie") that crashed or otherwise becomes unresponsive prior to completing the write of the sub-batch of data blocks 22. In this scenario, the transform sink 160 cannot be sure how many data blocks 22 of the sub-batch of data blocks 22 the append transform 180a wrote prior to failure. Additionally, because the sub-batch of data blocks 22 is atomic, the append transform 180a can only update the storage log 170 with the intent to commit 182 once writing the entire sub-batch of data blocks 22 to the data store 146.

To avoid potential duplication of any data blocks 22 already written by the assigned buffered stream 184aa, the append transform 180a may generate or assign a new buffered stream 180ab and retry, using the new buffered stream 18ab, writing the sub-batch of data blocks 22 to the data store 146. In this case, both the buffered stream 184aa and the buffered stream 184ab are associated with the same append transform 180a. In some implementations, the retry using the assigned new buffered stream 184ab is successful in completing the write of the sub-batch of data blocks 22 to the data store 146, and the append transform 180a updates the storage log 170 accordingly. As discussed in more detail with regards to FIGS. 5A-5C, the update includes the intent to commit 182 for the sub-batch of data blocks 22 written via the assigned new buffered stream 184ab.

In some examples, the previously crashed assigned buffered stream 184aa recovers at a period of time after the assigned buffered stream 184ab has already updated the storage log 170 with the intent to commit 182 the sub-batch of data blocks 22. In this case, the buffered stream 184aa, prior to recording the intent to commit 182, determines that the storage log 170 already includes an intent to commit (recorded by the new buffered stream 184*ab*) and aborts recording the intent to commit 182 the sub-batch of data blocks 22. In other words, the buffered stream 184*aa* of the append transform 180*a* reads the storage log 170 and determines that another buffered stream 184*ab* previously recorded the intent to commit 182 the sub-batch of data blocks 22, and therefore the buffered stream 184*aa* should not record an intent to commit 182 the sub-batch of data blocks 22 to the data store 146 (i.e., to avoid duplication). In order to ensure that sub-batch of data blocks 22 is written to data store 146 exactly once, the assigned buffered stream 184*aa* abandons or aborts the update and does not add a second intent to commit 182 to the storage log 170. In this case, the data blocks 22 written by the assigned buffered stream 184*aa* will never be committed. After a threshold amount of time, a removal process 210 may remove the data blocks 22 written by the buffered stream 184*aa* from the data store 146. In some implementations, the removal process 210 includes garbage collection of the sub-batch of data blocks 22 assigned to buffered stream 184*aa*.

In some implementations, the transform sink 160 determines that a sub-batch of data blocks 22 in the batch of data blocks 22 has failed to complete (i.e., the data blocks 22 have not been written by an append transform 180 and/or committed by a flush transform 190). In response, the remote system 140 sends a batch failure indication 230 to the user device 10 associated with the user 12. In some implementations, the user 12 elects to abandon the batch of data blocks 22. In other implementations, in response to receiving the batch failure indication 230, the user submits a retry 240 to the remote system 140. The retry 240 may include the same batch of data blocks 22 to write to the data store 146 with the same corresponding sequence numbers 21 and row count 20. This retry 240 may prompt the transform sink 160 to assign the retry 240 to a different append transform 180 and assign a new buffered stream 184.

Figure 2B:
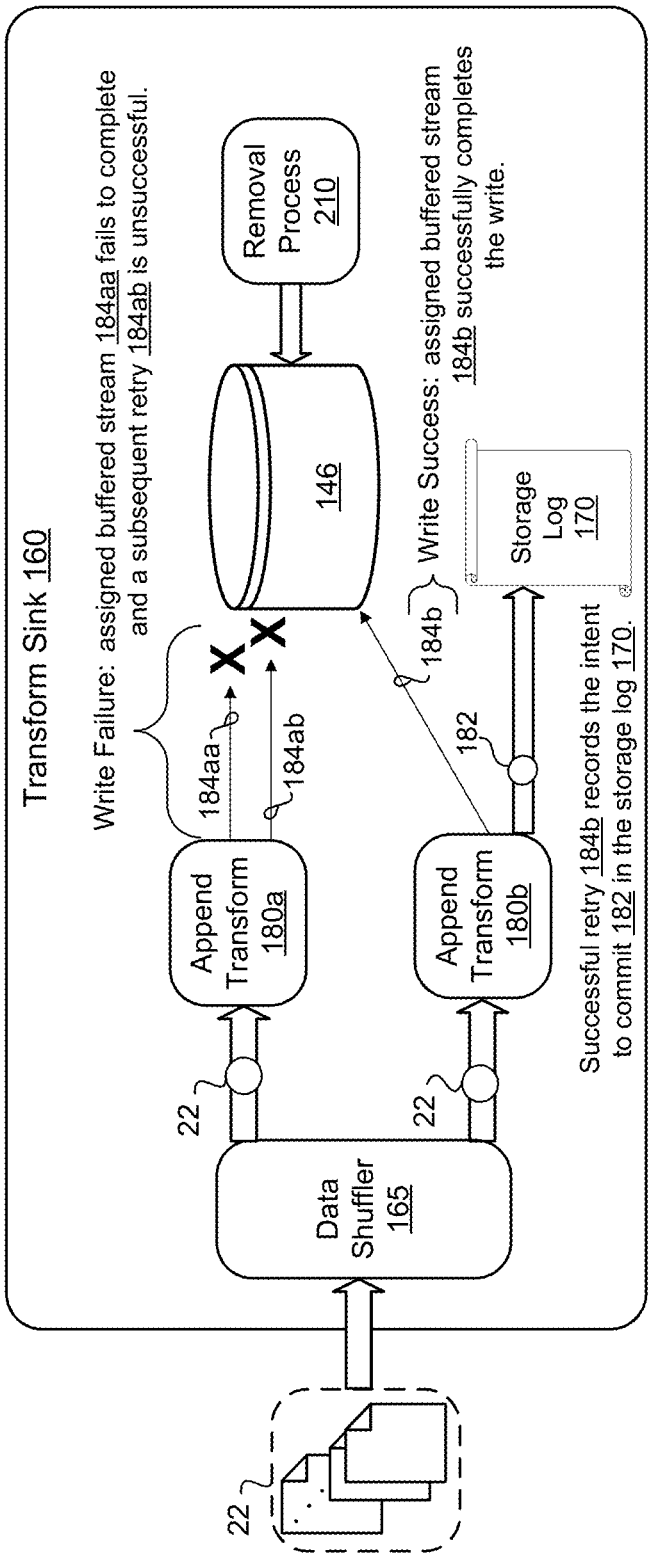

Referring now to FIG. 2B, schematic view 200*b* illustrates transform sink 160 determining that writing the sub-batch of data blocks 22 to the data store 146 with the original append transform is unsuccessful. Here, the original append transform 180*a* has been unable to complete the write with either buffered stream 184*aa* or buffered stream 184*ab*. The transform sink 160 may determine (e.g., after a threshold period of time) that the append transform 180*a* has failed to write the sub-batch of data blocks. For example, the transform sink 160 determines that the append transform 180*a* fails to record the intent to commit 182 to the storage log 170 within the threshold period of time. In some examples, after such a failure, the data shuffler 165 assigns a new append transform 180*b* to write the sub-batch of data blocks 22 to the data store with an assigned buffered stream 184*b*.

The append transform 180*b* may, via the assigned buffered stream 184*b*, write the sub-batch of data blocks 22 to the data store 146. As mentioned above, because the sub-batch of data blocks 22 is atomic, the append transform 180*b* must complete writing all data blocks 22 in the sub-batch of data blocks 22 before the append transform 180*b* updates the storage log 170 with the intent to commit 182. Here, the assigned buffered stream 184*b* successfully completes the write of the sub-batch of data blocks 22 to the data store 146, and updates the storage log 170 with the intent to commit 182.

In some examples, the append transform 180*a* and/or the assigned buffered streams 184*aa*, 184*ab* recovers after the threshold period of time has passed and the new append transform 180*b* and the assigned buffered stream 184*b* have recorded the intent to commit 182 to the storage log 170. In this case, the append transform 180*a* determines that the sub-batch of data blocks 22 has already been committed. For example, the append transform 180*a* determines that the storage log 170 includes the intent to commit 182 associated with the sub-batch of data blocks 22 and/or a corresponding commit complete indication 192 (FIG. 5C). In other words, the append transform 180*a* determines that the sub-batch of data blocks 22 has already been completed and/or committed by another append transform 180*b*, and therefore should not record the intent to commit 182 to avoid committing the sub-batch of data blocks 22 more than once.

Thus, in order to ensure that sub-batch of data blocks 22 is written to data store 146 exactly once, the append transform 180*a* may abandon any updates or recordings to the storage log 170. Alternatively, the append transform 180*a* still records its intent to commit 182, but the corresponding flush transform 190 determines that the sub-batch of data blocks 22 was previously committed and declines flushing the second intent to commit 182. In either scenario, the data blocks 22 written to the data store 146 by the assigned buffered streams 184*aa*, 184*ab* will never be committed. After a threshold amount of time, the removal process 210 removes the data blocks 22 written by buffered streams 184*aa*, 184*ab* from the data store 146. For example, periodic garbage collection (e.g., once every hour, once every day, etc.) removes or deletes all written by not committed data blocks 22.

Figure 3:
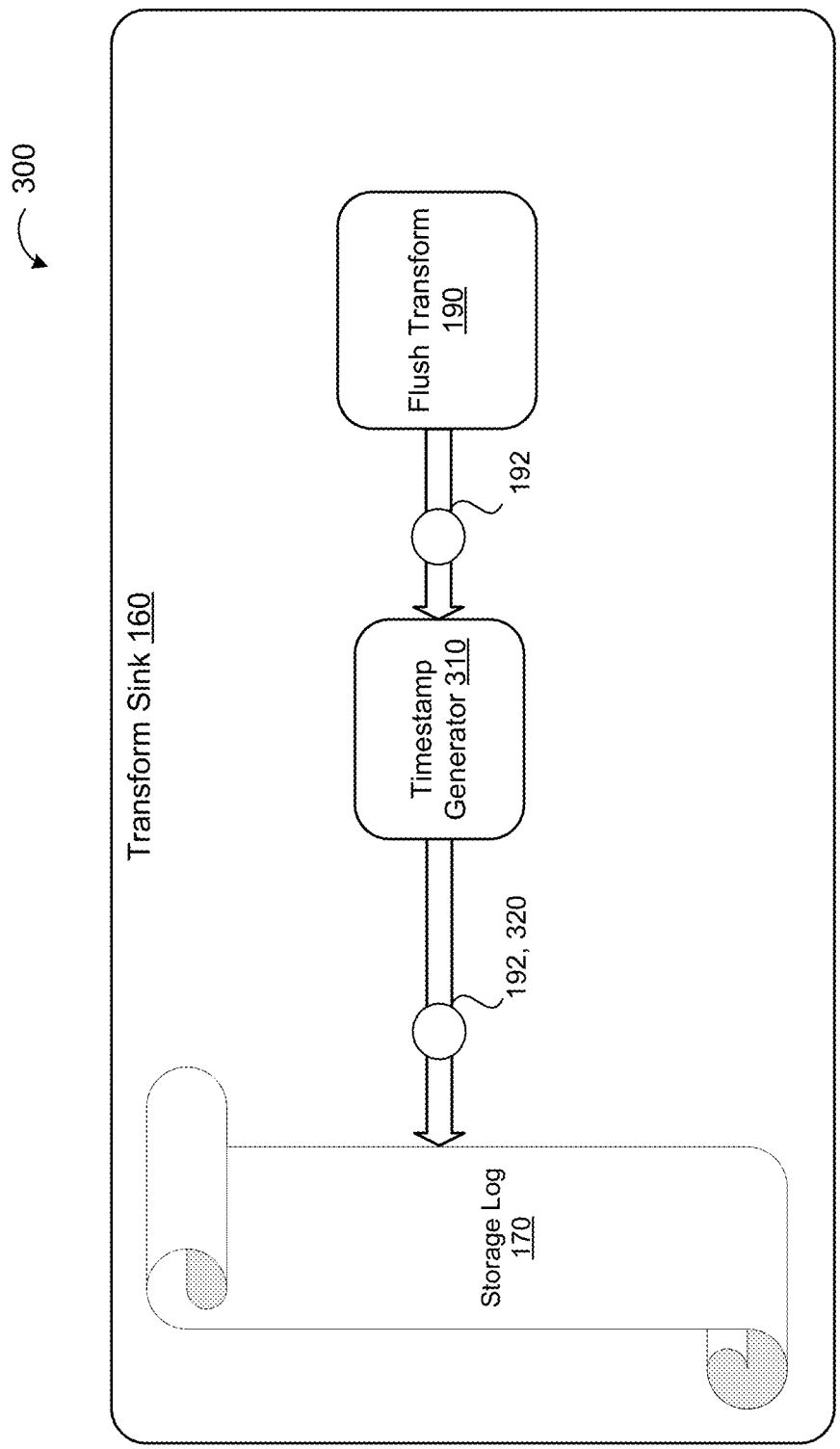
FIG. 3 is a schematic view of additional example components of the system of FIG. 1.

Referring now to FIG. 3, in some implementations, committing the sub-batch of data blocks 22 and updating the storage log with the commit complete indication 192 includes determining a commit timestamp 320. To this end, the transform sink 160 may include a timestamp generator 310, which receives the commit complete indication 192 for the storage log 170 from the flush transform 190. The timestamp generator 310 may generate a commit timestamp 320 that indicates a point in time that the sub-batch of data blocks 22 was committed by the flush transform 190. That is, each sub-batch of data blocks 22 is associated with a commit timestamp 320 that generally indicates when the sub-batch of data blocks 22 was committed by the flush transform 190. Here, the timestamp generator 310 output includes the commit complete indication 192 for the sub-batch of data blocks 22 associated with the commit timestamp 320. The transform sink 160 (e.g., the timestamp generator 310 or the flush transform 190) updates the storage log 170 with the commit complete indication 192. In some implementations, the transform sink 160 converts the committed sub-batch of data blocks 22 into a read-optimized format based on the associated commit timestamp 320 of the commit complete indication 192. However, the commit complete indication 192 and associated commit timestamp 320 may be further in the storage log 170 than the intent to commit 182 for the sub-batch of data blocks 22. Accordingly, in order to match the sub-batch of data blocks 22 to its commit timestamp 320, the transform sink 160 must read further into the log (i.e., beyond the timestamp associated with the intent to commit 182) to find the associated commit complete indication 192 to determine the commit timestamp 320.

Figure 4:
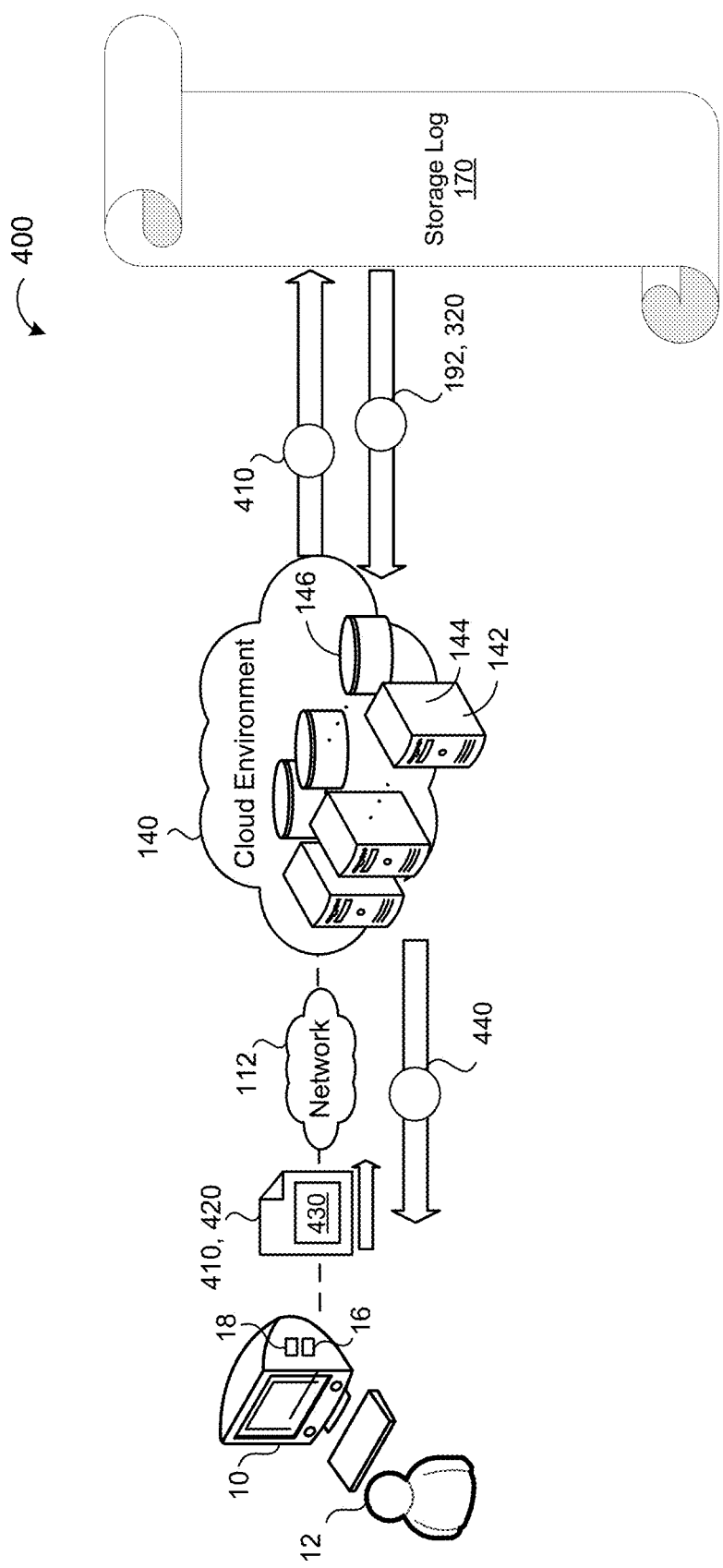
FIG. 4 is a schematic view of an example system for querying exactly-once processed data.

Referring to FIG. 4, schematic view 400 shows the remote system 140 receiving a query request 410 from the user device 10 via the network 112. The query request 410, for example, includes a request to return any data blocks 22 that match query parameters 420 included within the query request 410 (e.g., contain one or more keywords). The query request 410 includes a snapshot timestamp 430 that indicates a point in time that the remote system 140 should reference when determining which data blocks 22 match the query parameters 420. That is, the snapshot timestamp 430 indicates a point in time between the current time and when the table was created. The remote system 140 must evaluate a state of the table (and the data blocks 22) at the snapshot timestamp 430. In some examples, the snapshot timestamp 430 is the current time. In other examples, the snapshot timestamp 430 is an earlier point in time than the current time.

In response to receiving the query request 410, the remote system 140 reads the storage log 170 to determine commit complete indications 192 associated with the commit timestamps 320 that occur before the snapshot timestamp 430 and match the query parameters 420 included within the query request 410. Any data blocks 22 that match the query parameters 420 (e.g., contain the matching keyword(s)) are returned as a results batch 440 to the user device 10. In some implementations, the remote system returns only data blocks 22 with a commit timestamp 320 earlier than the snapshot timestamp 430 in the results batch 440. That is, the query request 410 only applies to sub-batches of data blocks 22 that have been both written by the append transform 180 and committed by the flush transform 190 prior to the snapshot timestamp 430.

Figure 5A:
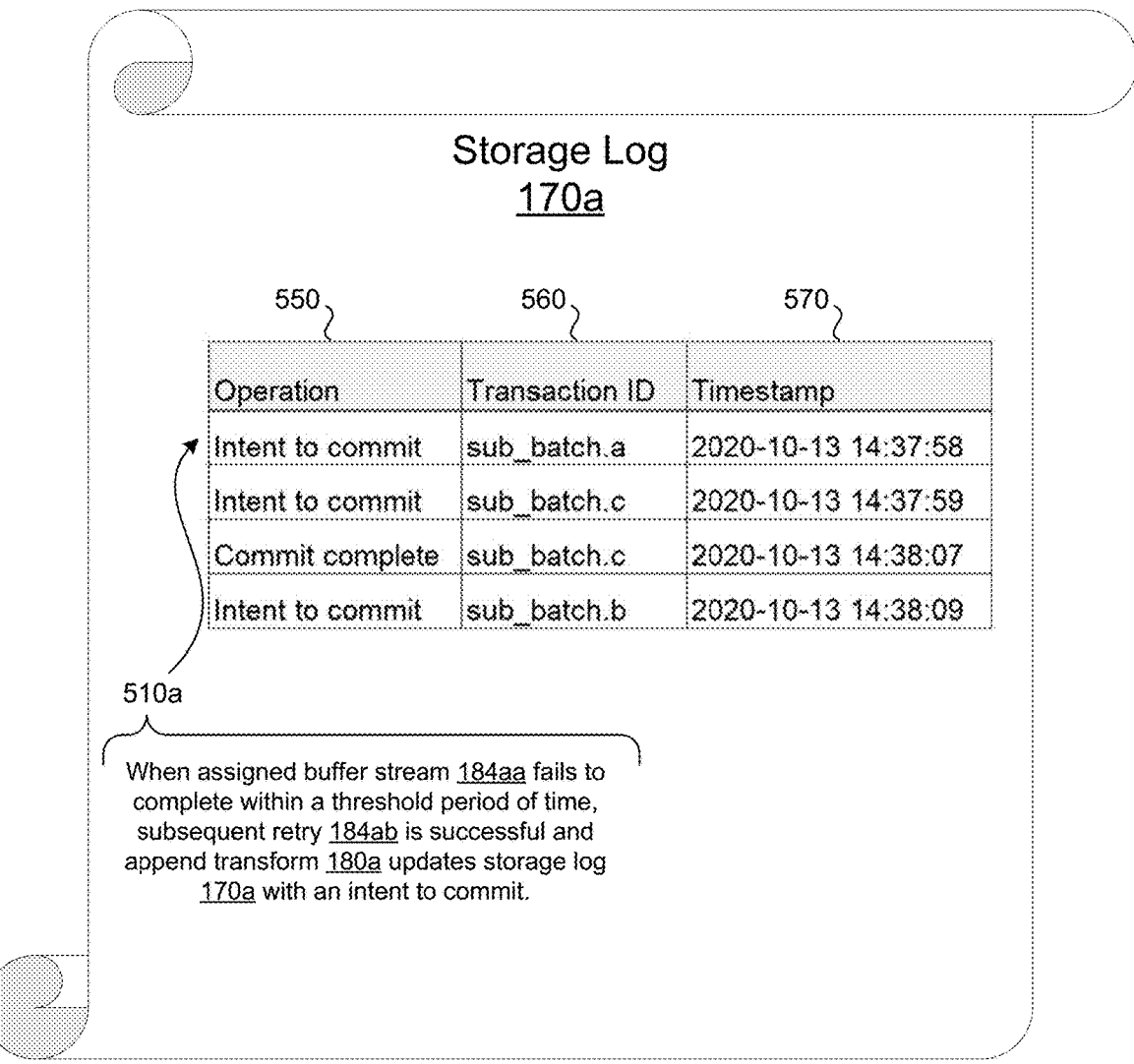
FIGS. 5A-5C are schematic views of example components of FIGS. 2A and 2B.
Figure 5B:
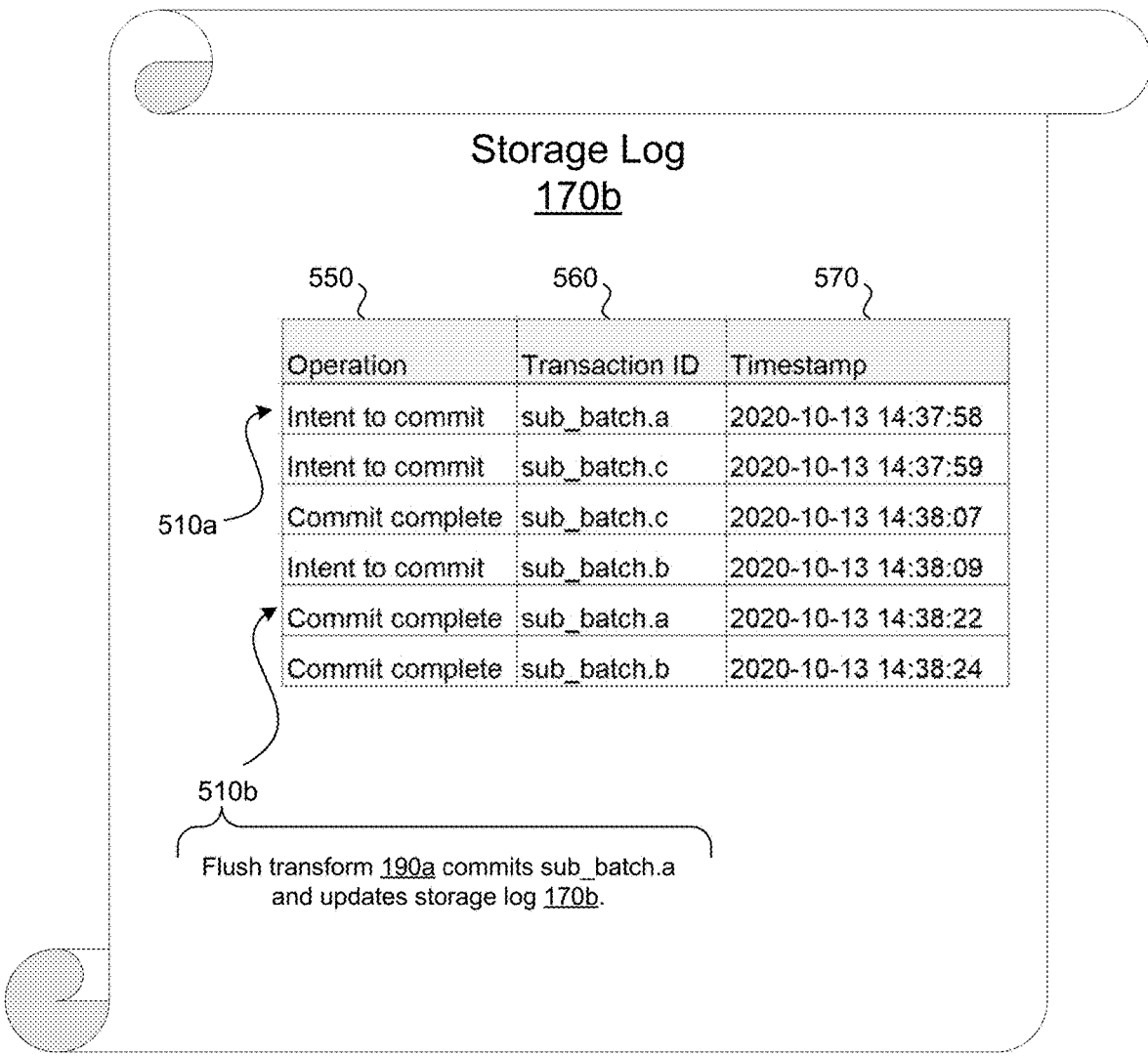
Figure 5C:
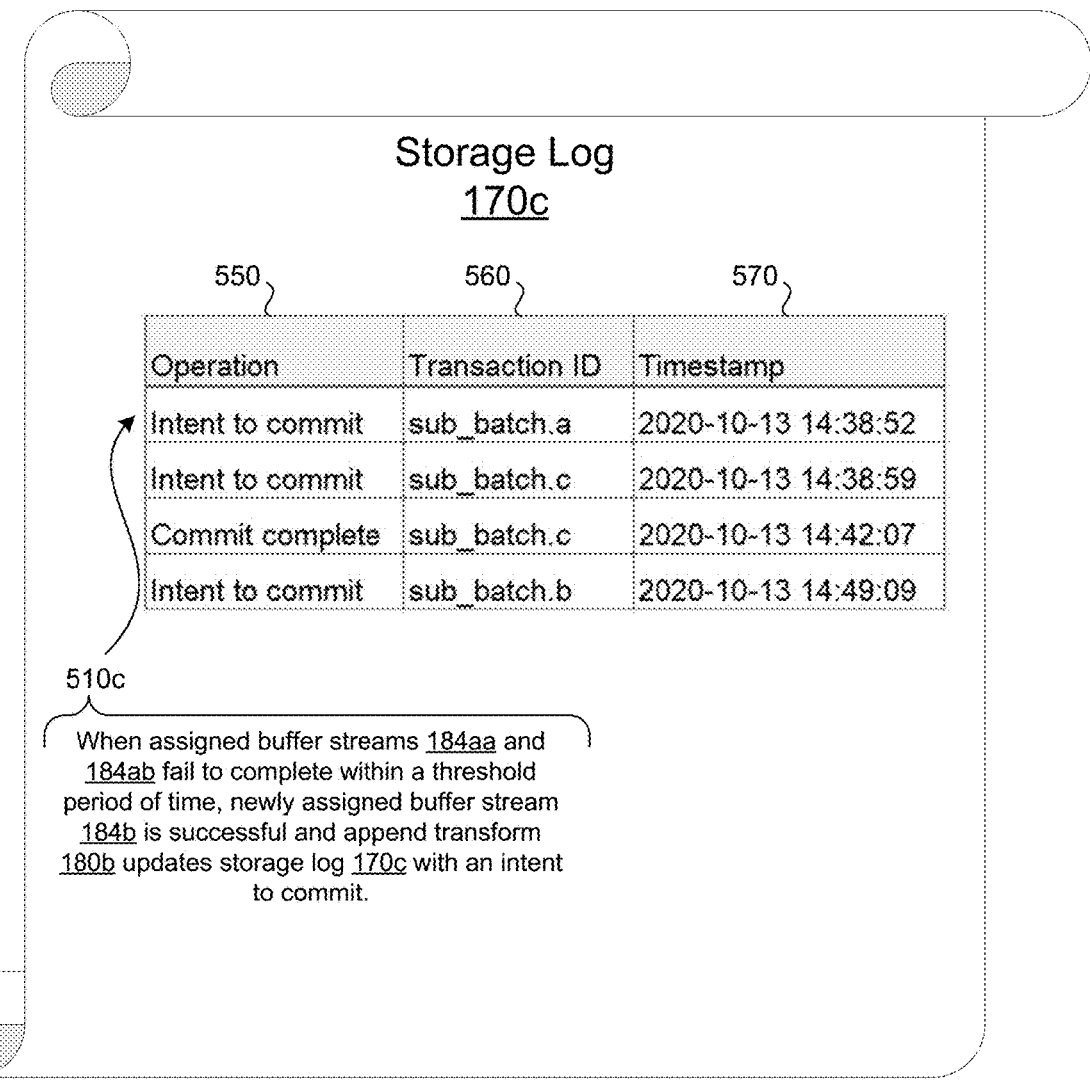

FIGS. 5A-5C include example storage logs 170a-c with updates from the append transforms 180a-c and the flush transforms 190a-c. Specifically, each storage log 170a-c depicts a storage log 170 identifying updates by an operation 550, a transaction identifier (ID) 560, and a log timestamp 570. The operations 550 include, for example, indications of the intent to commit 182 and commit complete indication 192. The transaction IDs 560 record an identifier of the respective sub-batch of data blocks 22. The log timestamp 570 indicates the point in time the corresponding operation 550 was recorded to the storage log 170.

Referring to FIG. 5A, in some implementations (such as shown in FIG. 2A) a buffered stream 184aa assigned to a first sub-batch of data blocks 22 (i.e. sub_batch.a) fails to update the storage log 170a with the intent to commit 182 within a threshold amount of time. The append transform 180a may attempt a subsequent retry by opening a new buffered stream 184ab to again attempt to write the sub-batch of data blocks 22 to the data store 146. In the example shown, subsequent retry on buffered stream 184ab is successful and the append transform 180a updates the storage log 170a with the intent to commit 182 at record 510a. The storage log 170a reflects the record 510a including the operation 550 of the intent to commit 182, the transaction ID 560 indicating that the sub-batch of data blocks 22 was successfully written, and the log timestamp 570 indicating the point in time (e.g., 2020-10-13 14:37:58) that that the record 510a was added to the storage log 170a and/or when the append transform 180a completes the write of the data blocks 22.

Referring to FIG. 5B a storage log 170b, like the storage log 170a, includes the record 510a indicating that the sub-batch of data blocks 22 was successfully written. Here, flush transform 190a commits the sub-batch of data blocks 22 and updates storage log 170b with the commit complete indication 192 and the associated commit timestamp 320 in record 510b. The record 510b includes the operation 550 of the commit complete indication 192, the transaction ID 560 indicating that the sub-batch of data blocks 22 was successfully committed, and the log timestamp 570 indicating the point in time associated commit timestamp 320 that the sub-batch of data blocks 22 was committed. As mentioned with reference to FIGS. 2A and 2B above, when the assigned worker (i.e., append transform 180a using buffered stream 184aa) completes a write for the sub-batch of data blocks 22, the worker encounters the record 510b in the storage log 170b and determines to not record the intent to commit 182 to the storage log 170b.

Referring to FIG. 5C, in some implementations (such as shown in FIG. 2B), both the buffered stream 184aa and the subsequent one or more retries (e.g., buffered stream 184ab) fail to update the storage log 170c with an intent to commit 182 within the threshold amount of time. In this case, the transform sink 160 reassigns, using the data shuffler 165, the sub-batch of data blocks 22 to the append transform 180b. In response to receiving the sub-batch of data blocks 22, the append transform 180b opens or generates a new buffered stream 184b to write the sub-batch of data blocks 22 to the data store 146. In the example shown, the newly assigned buffered stream 184b is successful and the append transform 180b updates the storage log 170c with an intent to commit 182 in record 510c. The record 510c includes the operation 550 of the intent to commit 182, the transaction ID 560 indicating that the sub-batch of data blocks 22 was successfully written, and the log timestamp 570 indicating the point in time that that the record 510c was added to the storage log 170c and/or when the append transform 180b completes the write of the data blocks 22.

Figure 6:
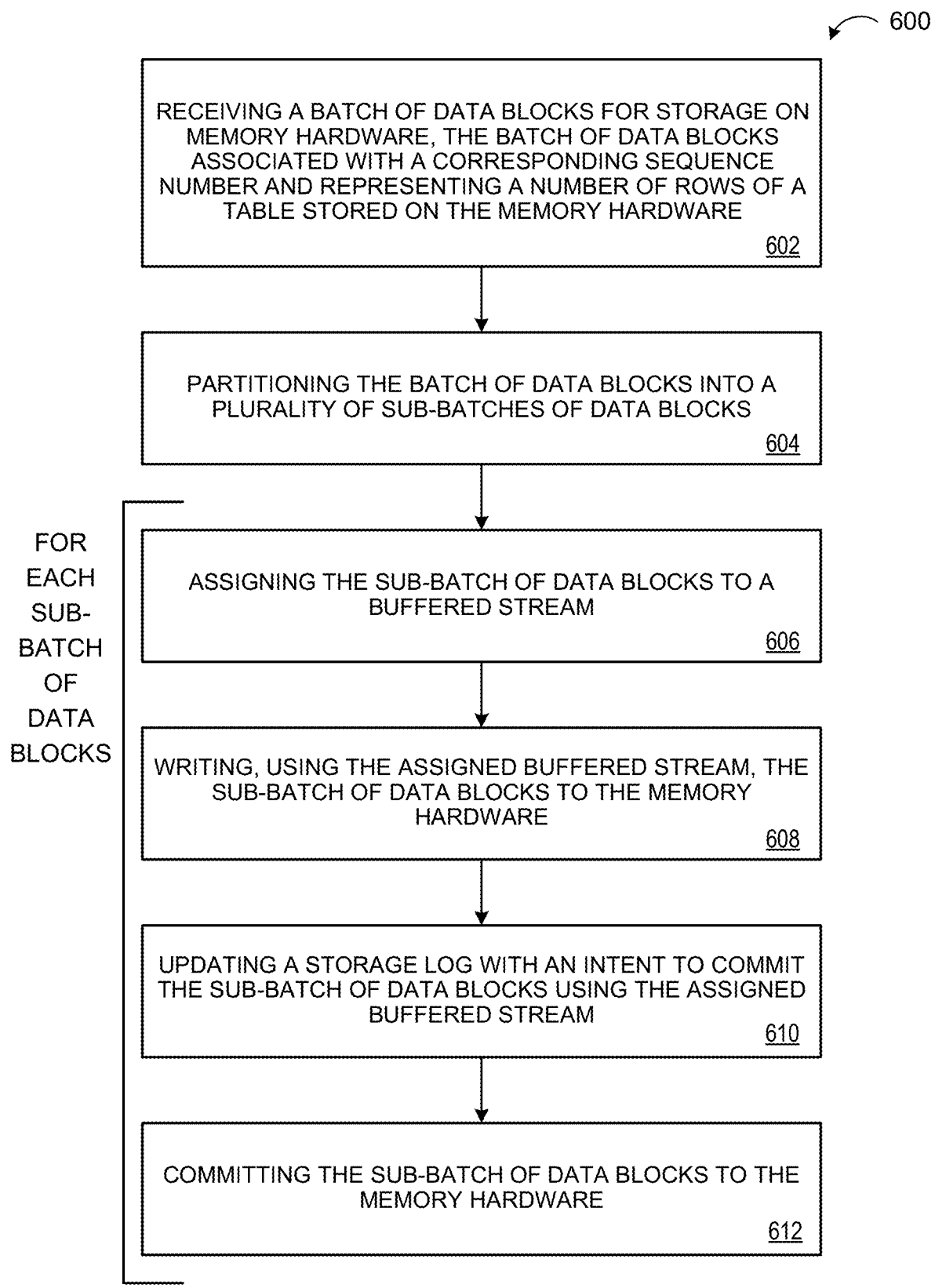
FIG. 6 is a flowchart of an example arrangement of operations for a method of processing data exactly once using transactional streaming writes.

FIG. 6 is a flowchart of an exemplary arrangement of operations for a method 600 of processing data exactly once using transactional streaming writes. The method 600 includes, at operation 602, receiving, at data processing hardware 144, a batch of data blocks 22 for storage on memory hardware 146 in communication with the data processing hardware 144. The batch of data blocks 22 is associated with a corresponding sequence number 21 and represents a number of rows 20 of a table stored on the memory hardware 146. At operation 604, the method 600 includes partitioning, by the data processing hardware 144, the batch of data blocks 22 into a plurality of sub-batches of data blocks 22.

For each sub-batch of data blocks 22, the method 600 includes, at operation 606, assigning, by the data processing hardware 144, the sub-batch of data blocks 22 to a buffered stream 184. The buffered stream 184 may be associated with an append transform 180 and a flush transform 190. The append transform 180 writes the sub-batch of data blocks 22, and the flush transform 190 commits the sub-batch of data blocks 22. At operation 608, the method includes writing, by the data processing hardware 144, using the assigned buffered stream 184, the sub-batch of data blocks 22 to the memory hardware 146. The memory hardware 146 may be overlain on storage resources 142 to allow scalable use of the storage resources 142 by the data processing hardware 144.

At operation 610, the method 600 includes updating, by the data processing hardware 144, a storage log 170 with an intent to commit 182 the sub-batch of data blocks 22 using the assigned buffered stream 184. For each sub-batch of data blocks 22, the method 600 further includes, at operation 612, committing, by the data processing hardware 144, the sub-batch of data blocks 22 to the memory hardware 146. In response to committing, by the data processing hardware 144, the sub-batch of data blocks 22 to the memory hardware 146, the flush transform 190 may update, by the data processing hardware 144, the storage log with a commit complete indication 192.

Figure 7:
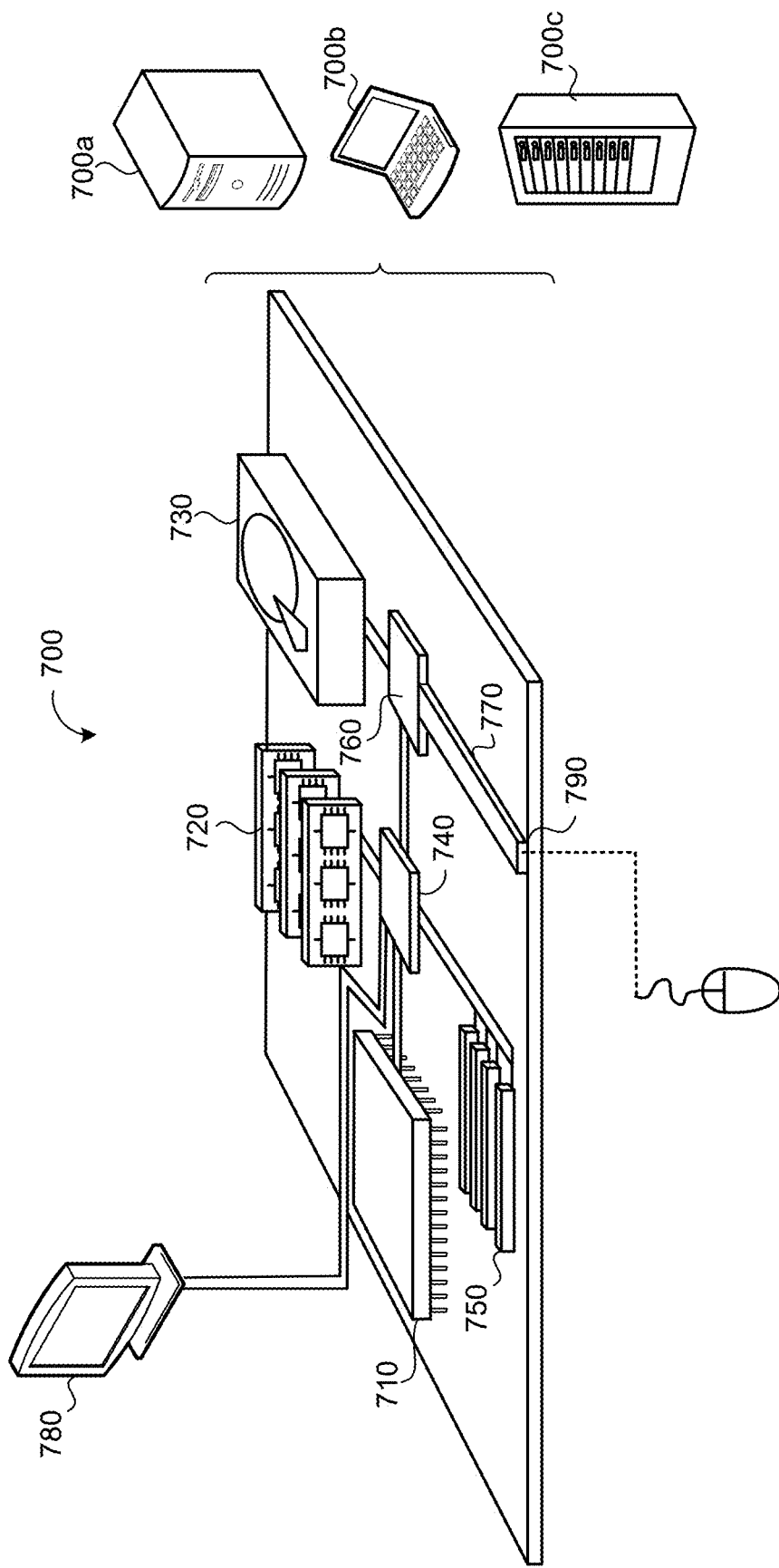
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, from a client, a batch of data blocks for storage on memory hardware in communication with the data processing hardware;
   partitioning the batch of data blocks into a plurality of sub-batches of data blocks;
   assigning each sub-batch of data blocks of the plurality of sub-batches of data blocks to a respective buffered stream, each respective buffered stream configured to write the assigned sub-batches to the memory hardware;
   determining that a particular sub-batch of data blocks of the plurality of sub-batches of data blocks failed to be written to the memory hardware;
   in response to determining that the particular sub-batch of data blocks of the plurality of sub-batches of data blocks failed to be written to the memory hardware, assigning the particular sub-batch of data blocks to a new respective buffered stream; and
   receiving an intent to commit the particular sub-batch of data blocks using the new respective buffered stream, the intent to commit indicating that the particular sub-batch of data blocks is successfully written to the memory hardware.

2. The method of claim 1, wherein the batch of data blocks are associated with a corresponding sequence number and representing a number of rows of a table stored on the memory hardware.

3. The method of claim 1, wherein the operations further comprise, in response to determining that the particular sub-batch of data blocks of the plurality of sub-batches of data blocks failed to be written to the memory hardware, retrying, using the respective assigned buffered stream, to write the particular sub-batch of data blocks to the memory hardware.

4. The method of claim 3, wherein the operations further comprise determining that retrying, using the respective assigned buffered stream, to write the particular sub-batch of data blocks to the memory hardware has failed to complete before committing the particular sub-batch of data blocks to the memory hardware.

5. The method of claim 4, wherein the operations further comprise removing, from the memory hardware, the particular sub-batch of data blocks from the respective assigned buffered stream.

6. The method of claim 5, wherein removing, from the memory hardware, the particular sub-batch of data blocks from the respective assigned buffered stream comprises performing garbage-collection on the particular sub-batch of data blocks from the respective assigned buffered stream.

7. The method of claim 1, wherein the operations further comprise:
   in response to receiving the intent to commit the particular sub-batch of data blocks to the memory hardware, determining a current timestamp; and
   associating the particular sub-batch of data blocks with the current timestamp.

8. The method of claim 7, wherein the operations further comprise converting the particular sub-batch of data blocks into a read-optimized format based on the current timestamp.

9. The method of claim 7, wherein the operations further comprise:
   receiving a query request at a snapshot timestamp, the query request requesting return of data blocks stored on the memory hardware that match query parameters; and
   returning any data blocks of the particular sub-batch of data blocks that match the query parameters when the snapshot timestamp is later than the current timestamp associated with the particular sub-batch of data blocks.

10. The method of claim 1, wherein the intent to commit indicates committing the particular sub-batch of data blocks to the memory hardware using a flush transform.

11. A system comprising:
    data processing hardware; and
    memory hardware in communication with the data processing hardware, the memory hardware storing instructions that when executed on the data processing hardware cause the data processing hardware to perform operations comprising:
      receiving, from a client, a batch of data blocks for storage on memory hardware in communication with the data processing hardware;
      partitioning the batch of data blocks into a plurality of sub-batches of data blocks;
      assigning each sub-batch of data blocks of the plurality of sub-batches of data blocks to a respective buffered stream, each respective buffered stream configured to write the assigned sub-batches to the memory hardware;

determining that a particular sub-batch of data blocks of the plurality of sub-batches of data blocks failed to be written to the memory hardware;

in response to determining that the particular sub-batch of data blocks of the plurality of sub-batches of data blocks failed to be written to the memory hardware, assigning the particular sub-batch of data blocks to a new respective buffered stream; and receiving an intent to commit the particular sub-batch of data blocks using the new respective buffered stream, the intent to commit indicating that the particular sub-batch of data blocks is successfully written to the memory hardware.

12. The system of claim 11, wherein the batch of data blocks are associated with a corresponding sequence number and representing a number of rows of a table stored on the memory hardware.

13. The system of claim 11, wherein the operations further comprise, in response to determining that the particular sub-batch of data blocks of the plurality of sub-batches of data blocks failed to be written to the memory hardware, retrying, using the respective assigned buffered stream, to write the particular sub-batch of data blocks to the memory hardware.

14. The system of claim 13, wherein the operations further comprise determining that retrying, using the respective assigned buffered stream, to write the particular sub-batch of data blocks to the memory hardware has failed to complete before committing the particular sub-batch of data blocks to the memory hardware.

15. The system of claim 14, wherein the operations further comprise removing, from the memory hardware, the particular sub-batch of data blocks from the respective assigned buffered stream.

16. The system of claim 15, wherein removing, from the memory hardware, the particular sub-batch of data blocks from the respective assigned buffered stream comprises performing garbage-collection on the particular sub-batch of data blocks from the respective assigned buffered stream.

17. The system of claim 11, wherein the operations further comprise:
   in response to receiving the intent to commit the particular sub-batch of data blocks to the memory hardware, determining a current timestamp; and
   associating the particular sub-batch of data blocks with the current timestamp.

18. The system of claim 17, wherein the operations further comprise converting the particular sub-batch of data blocks into a read-optimized format based on the current timestamp.

19. The system of claim 17, wherein the operations further comprise:
   receiving a query request at a snapshot timestamp, the query request requesting return of data blocks stored on the memory hardware that match query parameters; and
   returning any data blocks of the particular sub-batch of data blocks that match the query parameters when the snapshot timestamp is later than the current timestamp associated with the particular sub-batch of data blocks.

20. The system of claim 11, wherein the intent to commit indicates committing the particular sub-batch of data blocks to the memory hardware using a flush transform.

* * * * *